US009835455B2

(12) United States Patent
Cassagnes et al.

(10) Patent No.: US 9,835,455 B2
(45) Date of Patent: Dec. 5, 2017

(54) DRIVE CIRCUITRY AND METHOD FOR A VIBRATION GYROSCOPE

(71) Applicant: FREESCALE SEMICONDUCTOR, INC., Austin, TX (US)

(72) Inventors: Thierry Cassagnes, Tournefeuille (FR); Hugues Beaulaton, Toulouse (FR); Laurent Cornibert, Toulouse (FR); Marianne Maleyran, Saubens (FR); Volker Wahl, Toulouse (FR)

(73) Assignee: NXP USA, Inc., Austin, TX (US)

( * ) Notice: Subject to any disclaimer, the term of this patent is extended or adjusted under 35 U.S.C. 154(b) by 350 days.

(21) Appl. No.: 14/556,634

(22) Filed: Dec. 1, 2014

(65) Prior Publication Data
US 2015/0345946 A1 Dec. 3, 2015

(30) Foreign Application Priority Data
Apr. 24, 2014 (WO) .................. PCT/IB2014/002102

(51) Int. Cl.
*G01C 19/5776* (2012.01)
(52) U.S. Cl.
CPC ................ *G01C 19/5776* (2013.01)
(58) Field of Classification Search
CPC .......................... G01C 19/5712; G01C 19/5705
USPC ....................................................... 73/504.12
See application file for complete search history.

(56) References Cited

U.S. PATENT DOCUMENTS

| | | | |
|---|---|---|---|
| 6,585,338 B2 | 7/2003 | Harris | |
| 2010/0039409 A1* | 2/2010 | Govil | B81C 99/003 345/204 |
| 2011/0146403 A1 | 6/2011 | Rizzo Piazza Roncoroni et al. | |
| 2014/0144230 A1* | 5/2014 | Magnoni | G01C 19/56 73/504.12 |
| 2014/0266474 A1 | 9/2014 | Schlarmann et al. | |
| 2016/0290804 A1* | 10/2016 | Cassagnes | G01C 19/5726 |

FOREIGN PATENT DOCUMENTS

| | | |
|---|---|---|
| WO | 2014006437 A1 | 1/2014 |
| WO | 2014072762 A1 | 5/2014 |

* cited by examiner

*Primary Examiner* — Walter L Lindsay, Jr.
*Assistant Examiner* — Philip Marcus T Fadul
(74) *Attorney, Agent, or Firm* — Charlene R. Jacobsen

(57) ABSTRACT

A drive circuitry for a vibration gyroscope is described. The drive circuitry comprises a digital phase shifter, a variable gain amplifier and a pulse signal generator arranged to generate a digital pulse signal having a frequency substantially equal to a drive frequency of the vibration gyroscope. A controller is arranged to connect drive actuation units of the vibration gyroscope to outputs of the pulse signal generator during a first start-up time period, to outputs of the digital phase shifter during a second start-up time period, and to outputs of the variable gain amplifier during a measurement time period. Furthermore, a vibration gyroscope device and a method of driving a vibration gyroscope are described.

17 Claims, 4 Drawing Sheets

DRIVE CIRCUITRY AND METHOD FOR A VIBRATION GYROSCOPE

CROSS REFERENCE TO RELATED APPLICATION(S)

The present application claims priority to International Patent Application No. PCT/IB2014/002102, entitled "DRIVE CIRCUITRY AND METHOD FOR A VIBRATION GYROSCOPE," filed on Apr. 24, 2014, the entirety of which is herein incorporated by reference.

FIELD OF THE INVENTION

This invention relates to a drive circuitry for a vibration gyroscope, a vibration gyroscope device comprising such a drive circuitry, an associated apparatus, an associated semiconductor device and associated methods.

BACKGROUND OF THE INVENTION

Vibrating micro-electro-mechanical-system (MEMS) gyroscopes are used in a variety of systems where an angular rotation rate is to be measured. A vibrating MEMS gyroscope hereto comprises a gyroscope mass that is connected by springs to a substrate. The gyroscope mass is movable along a driving axis in resonant oscillation by the use of a drive force to provoke and maintain the movement. The drive force is supplied and controlled using a drive actuation unit and a drive measurement unit and associated circuitry. The drive actuation unit comprises, e.g., a capacitive coupling along the driving axis between a capacitor plate on the substrate and an opposite capacitor plate on the movable gyroscope mass. A force acting on the gyroscope mass may be induced as a capacitive force by applying a voltage to the capacitor plates of the drive actuation unit, whereby the gyroscope mass is moved. The drive measurement unit comprises, e.g., a similar pair of capacitor plates. The capacitance between the capacitor plates of the drive measurement unit is measured as a drive measurement signal and forms an indication of the displacement of the gyroscope mass along the driving axis.

A Coriolis force will apply to the gyroscope mass in the presence of an angular rotation. The Coriolis force is proportional to the velocity of the gyroscope mass, its angular rate of rotation and its mass, and perpendicular to the direction of movement. The Coriolis force hereby results in a displacement of the gyroscope mass along a sensing axis perpendicular to the driving axis. Measurement of the displacement of the gyroscope mass along the sensing axis can be used to obtain a measure of the Coriolis force and thus a measure of the angular rate of rotation. Hereto, a sense measurement unit is provided which, similar to the drive measurement unit, may comprise a capacitive coupling along the sensing axis between a sense capacitor plate on the substrate and an opposite sense capacitor plate on the movable gyroscope mass. The capacitance between the sense capacitor plates of the sense measurement unit is measured as a sense measurement signal and forms an indication of the displacement of the gyroscope mass along the sensing axis.

Determination of the angular rotation rate requires a consistent movement of the gyroscope mass along the driving axis. Hereto, the vibrating MEMS gyroscope comprises a drive circuitry to measure and control the amplitude of the, sinusoidal, movement of the gyroscope mass. In a vibrating MEMS gyroscope, measuring and controlling may be performed by determining a difference between a reference amplitude and the amplitude of the movement and controlling a gain of a drive actuation signal to control the drive actuation unit to supply the voltage to the capacitor plates of the drive actuation unit in accordance with the gain. In some vibrating MEMS gyroscopes, the amplitude of the movement may be measured by sampling the drive measurement signal once every period at extremes of the drive measurement signal by the use of a phase-locked loop (PLL) to determine an in-phase clock with an appropriate phase relative to the drive measurement signal. The PLL may thus maintain the appropriate phase also when the period of the drive measurement signal is changing, e.g., due to a change of the oscillation period of the gyroscope mass due to, e.g., environmental conditions such as temperature.

A short turn-on time of MEMS gyroscopes may enable pulsed mode operation that allows a reduction in power consumption. However, especially, but not exclusively, when using a low voltage (LV) technology (e.g. 0.18 um LV CMOS), short turn-on times are difficult to realize, if at all possible, when using the known technologies.

SUMMARY OF THE INVENTION

The present invention provides a drive circuitry for a vibration MEMS gyroscope, a vibration MEMS gyroscope device comprising such a drive circuitry, an apparatus, a semiconductor device and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
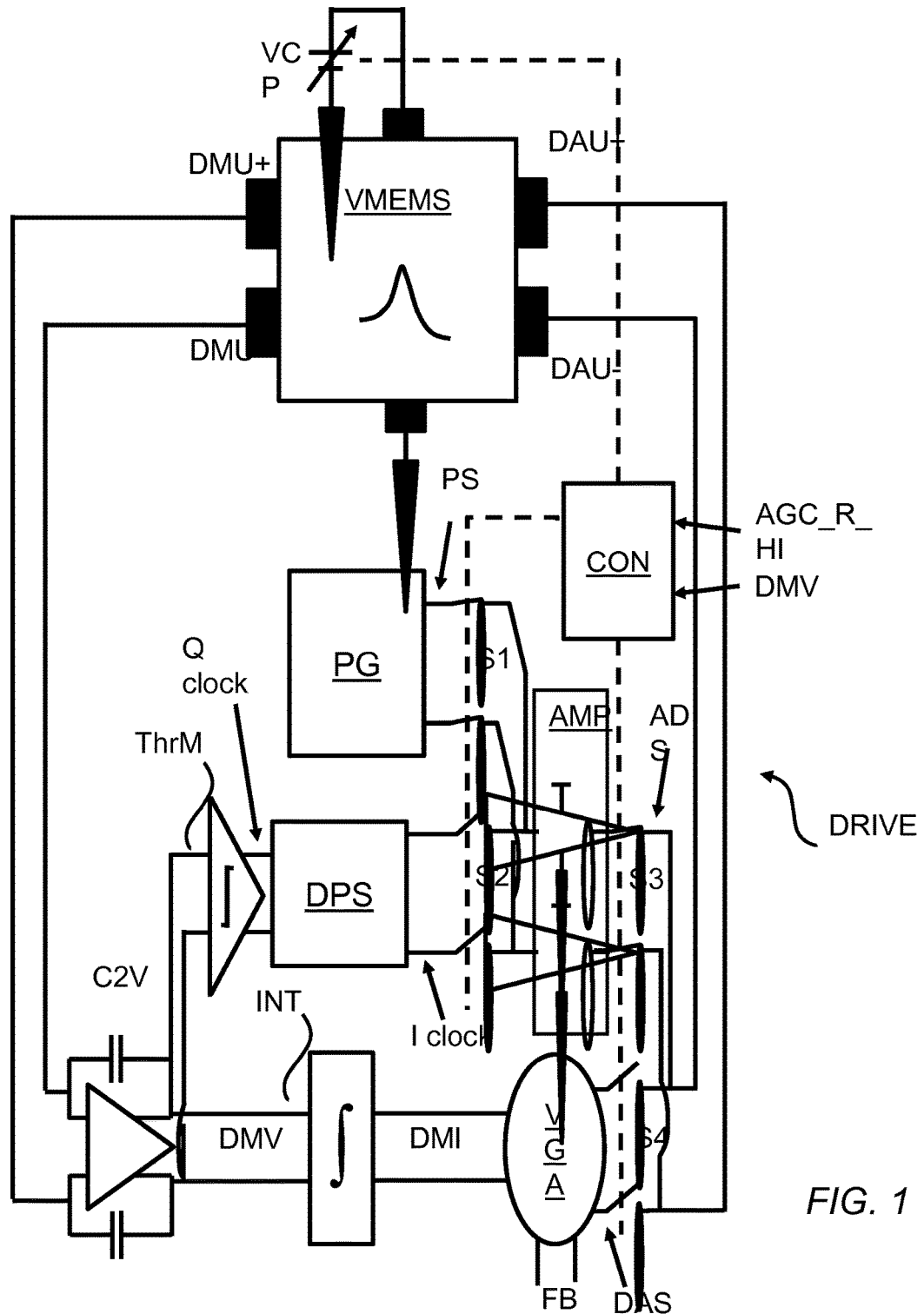
FIG. 1 schematically shows a block diagram of an example of an embodiment of a drive circuitry coupled to a vibration gyroscope.

FIG. 1 schematically shows a block diagram of an example of an embodiment of a drive circuitry DRIVE coupled to a vibration MEMS VMEMS. The drive circuitry DRIVE is arranged to drive the vibration MEMS VMEMS by way of applying suitable signals to drive actuation units DAU+ and DAU−.

The drive circuitry DRIVE comprises a voltage supply unit VCP, a capacitance-to-voltage converter C2V, a threshold detector ThrM, a digital phase shifter DPS, an integrator IN, a variable gain amplifier VGA, a pulse signal generator PG and a controller CON.

The voltage supply unit VCP may be arranged to deliver a supply voltage to a primary resonator of the vibration gyroscope. The voltage supply unit VCP may comprise a charge pump VCP arranged to create a charge pump voltage out of power source voltage. An example of a charge pump is a pump transferring a power source voltage of 1.75 V into a charge pump voltage of 10.5 V. Instead of a charge pump other types of voltage supply units may be used depending on the required voltage level and the available voltage level in the device.

The capacitance-to-voltage converter C2V is arranged to provide a drive measurement voltage signal DMV indicative of a displacement of a gyroscope mass along a drive axis of the vibration gyroscope. For that purpose the capacitance-to-voltage converter C2V may be connected to measurement capacitors (not shown) of the drive measurement units DMU+ and DMU−.

The threshold detector ThrM is coupled to the capacitance-to-voltage converter C2V to receive the drive measurement voltage signal DMV and is arranged to perform a threshold detection on the drive measurement voltage signal DMV to obtain a first digital signal Q_CLK.

The digital phase shifter DPS is coupled to the threshold detector ThrM to receive the first digital signal Q_CLK and is arranged phase shift the first digital to signal Q_CLK to obtain a second digital signal I_CLK. The integrator INT is coupled to the capacitance-to-voltage converter C2V to receive the drive measurement voltage signal DMV and is arranged to integrate the drive measurement signal to obtain an integrated drive measurement voltage signal DMI.

The variable gain amplifier VGA is coupled to the integrator INT to receive the integrated drive measurement voltage signal DMI and arranged to provide a drive actuation signal DAS using the integrated drive measurement voltage signal DMI and an amplifier gain control reference signal AGC_ref. The pulse signal generator PG is arranged to generate a digital pulse signal PS having a frequency substantially equal to a drive frequency Fd of the vibration gyroscope.

Figure 2:
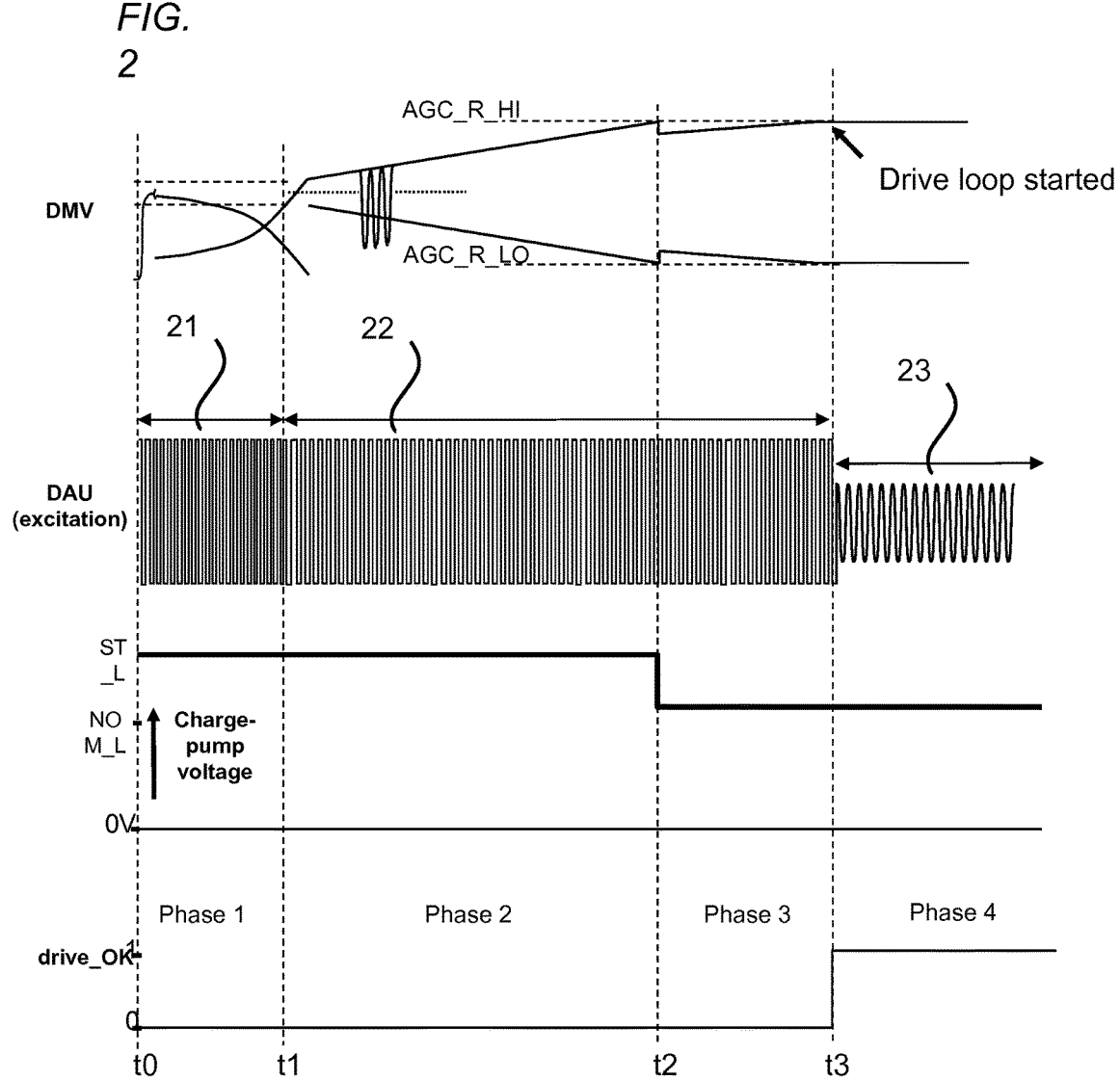
FIG. 2 shows graphs of various signals in the drive circuitry during the start-up sequence.

The controller CON is arranged to connect drive actuation units DAU+, DUA− of the vibration gyroscope VMEMS to outputs of the pulse signal generator PG during a first start-up time period 21, for allowing drive actuation units to receive the digital pulse signal PS from the pulse signal generator PG during the first start-up time period 21, see also FIG. 2.

FIG. 2 shows graphs of various signals during a start-up sequence for the vibration gyroscope according to an embodiment. FIG. 2 shows the output signal of the capacitance-to-voltage converter C2V, the positive drive actuation unit DAU+, the charge pump voltage and a drive status signal referred to as drive_OK signal. Note that in FIG. 2 the different graphs are stacked and have a common time axis (x-axis) but each graph has its own y-axis.

The controller CON is arranged to connect the drive actuation units DAU+, DAU− to outputs of the digital phase shifter DPS during a second start-up time period 22 following, in this example directly thereafter, the first start-up time period 21 for allowing the drive actuation units to receive the second digital signal I_CLK from the digital phase shifter DPS during the second start-up time period.

The controller CON is also arranged to connect the drive actuation units DAU+, DAU− to outputs of the variable gain amplifier VGA during a measurement time period 23 following, in this example separated therefrom by an optional period Phase 3, the second start-up time period 22, for allowing the drive actuation units to receive the drive actuation signal from the variable gain amplifier VGA during a measurement time period 23.

In the embodiment of FIG. 1, the circuitry DRIVE comprises a first pair S1, a second pair S2, a third pair S3 and a fourth pair S4 of controllable switches. The controller CON is arranged to control the switches S1, S2, S3, S4 in that the switches are opened and closed by the controller CON depending on a requested configuration. The first pair of switches S1 is closed (i.e. switched on) on during the first start-up time period 21. During that same period 21 the third pair of switches is closed as well so that the outputs of the pulse generator PG are connected to the respective drive actuation units DAU+, DAU−. During the first start-up period 21 the pulse generator PG provokes initial excitation of the VMEMS gyroscope mass. After a predefined time lapse t1−t0, or after a first threshold is reached by the DMV signal at the C2V output terminals, the controller CON opens switches S1 and close switches S2, so as to connect the output of the digital phase shifter DPS to the DAU units. The predefined time lapse t1−t0 may be for example 5.3 ms. If the frequency of the generated pulse signal PS is for example 17 kHz, the first start-up period 21 will contain about 90 pulse cycles.

During the second start-up period 22 the DUA units receive the I_CLK signal (also referred to as second digital signal) from the digital phase shifter DPS. The I_CLK signal has a frequency equal to the Q_CLK signal which is the drive frequency Fd.

The controller CON is arranged to close the fourth pair of switches S4 and open the third pair of switches S3 At a point in time t3. As a result, after point t3, the DAU units receive the drive actuation signal DAS generated by the gain amplifier VGA. Now the gyroscope is put in an operational mode which may also be referred to as the measurement time period, or phase 4, see FIG. 2.

In an embodiment, the controller CON is arranged to set the charge pump voltage to a nominal level NOM_L during the measurement time period 23, and to set the charge pump voltage to a start-up level ST_L during the first start-up time period 21, wherein the start-up level ST_L is higher than the nominal level NOM_L. For example of FIG. 2, the start-up level ST_L of the charge pump VCP may be 8.875 V and the nominal level may be 6.875 V.

In an embodiment the controller CON is arranged to keep the charge pump voltage at the start-up level during (at least a part of) the second start-up time period 22. In an embodiment the controller CON is arranged to decrease the charge pump voltage from the start-up level ST_L to the nominal level NOM_L when the drive measurement voltage signal DMV has reached a target value, see target value AGC_R_HI. In FIG. 2 this is occurring at time point t2. It should be clear for the skilled person that alternatively a negative target value, see target value AGC_R_LO can be used for comparison or both the values the signal AGC_R_LO and AGC_R_HI. In the following the target value is referred to as target level AGC_ref. Alternatively, the drop of the charge pump voltage could occur after a predefined time lapse determined during calibration testing.

To be able to detect that the drive measurement voltage signal DMV has reached the target value AGC_R_HI, the controller CON is arranged to receive the drive measurement voltage signal DMV from the capacitance-to-voltage converter C2V, and compare the drive measurement voltage signal DMV with a target value during the second start-up time period 22.

In an embodiment, the controller CON is arranged to, after decreasing the charge pump voltage from the start-up level ST_L (e.g. 8.875 V) to the nominal level NOM_L (e.g. 6.875 V), keep comparing the drive measurement voltage signal DMV with the target value AGC_ref until the drive measurement voltage signal DMV has reached the target value again at an end time (i.e. point t3) of the second start-up time period 22. At the end time t3 of period 22, the controller CON will switch the switches S3 and S4 so as to connect the drive actuation units DAU+, DAU− to outputs of the variable gain amplifier VGA.

By applying different actuation signals with changing amplitude as was shown in FIG. 2, a very short turn-on time can be achieved in three phases, referred to as phase 1, phase 2 and phase 3.

In phase 1, the drive mass of the gyroscope receives 'an initial kick' of a few ms (e.g. 5.3 ms). In this phase the drive mass is displaced enough to get a steady clock pulse (i.e. the Q_CLK signal). In an embodiment, the controller CON is arranged to detect the end of phase 1 by comparing a phase-1 target value to the drive measurement voltage signal DMV. The phase-1 target value may be equal to a few mV, typically lower than 5 mV. During phase 1, the amplifier AMP amplifies the pulses to a relatively high value lying in a range between e.g. 10-12 mV. The charge pump voltage may be set at a maximum level during phase 1.

In phase 2, also referred to as AC/DC Boost phase, the drive mass is quickly displaced using a high amplitude of the ADS signal (AC) and a high charge pump voltage (DC). A phase-2 target value may be set to a typical value of 1V, but this value could be higher. In phase 2 the I_CLK signal is directly sent to the actuation units DAU. The I_CLK signal can either be created by digitally phase shifting the Q_CLK signal or it may be generated out of a Phase Locked Loop (not shown), or it may be provided in other suitable ways.

In phase 3, also referred to as AC boost phase, the charge pump VCP is set to the nominal level (e.g. 6.875 V). By still exciting the actuation units DAU+, DAU− at a highest possible AC level (which in most cases will correspond to the maximum useable technology voltage), the DMV signal will increase again until the drive mass achieves a target displacement (i.e. AGC_R_HI, AGC_R_LO) at nominal supply voltage levels, see point t3 in FIG. 2. At that point in time the drive loop is started and an angular rate can be measured with sufficient accuracy.

In an embodiment, phase 3 is left out. In this embodiment the charge pump VCP will stay at the highest level ST_L during the whole second start-up time period 22, and is set back to the nominal level (e.g. 6.875 V) at the beginning of the measurement time period 23.

In the embodiment of FIG. 1, the drive circuitry DRIVE comprises an amplifier AMP arranged to amplify the digital pulse signal PS or the second digital signal I_CLK to obtain an amplified digital pulse signal ADS having an amplitude that is higher than an amplitude of the drive actuation signal DAS. The amplifier AMP may comprise a logic inverter biased at the highest supply voltage level that the ASIC technology used can tolerate. The power supply level of this amplifier sets the amplitude of the drive actuation pulses, it is set to its highest level in phases 1, 2 and 3, and then back to nominal level after drive loop was started.

The amplitude of the amplified digital pulse signal may be between 3.0-4.0 V, but other values are possible. In general, the higher the values, the more efficient the start-up procedure will be.

In an embodiment, the charge pump VCP is arranged to create a first and second charge pump voltage, the first charge pump voltage lying between 8.0-9.0 V, and the second charge pump voltage lying between 6.0-7.0 V. Typical values are between 8.5-8.9 V for the first charge pump voltage, and 6.5-6.9 V for the first charge pump voltage.

In an embodiment the pulse generator PG is arranged to produce a frequency of the digital pulse signal PS in the vicinity of the drive frequency of the vibration gyroscope, for example within e.g. a 10 percent range around the drive frequency Fd. The digital pulse frequency should be frequency trimmed at or close to the drive frequency Fd. In this way the primary resonator will be activated in the most effective way.

The embodiments of the drive circuitry DRIVE described above may be powered by a supply voltage which is less than 3 Volts, for example a voltage of 1.75 V. The drive circuitry DRIVE can be implemented using a low voltage technology (e.g. 0.18 um LV CMOS).

By performing the start-up sequences as described above with reference to FIGS. 1 and 2, very good results were achieved, even with the low voltage technology mentioned above. Experiments have shown that it is possible to achieve a 50 ms turn-on time or less.

In an embodiment a (angular) rate signal is measured for both a XY-direction and a Z-direction. The VMEMS gyroscope may then comprise two primary masses vibrating at two drive frequencies. In this embodiment the charge pump may be shared between two MEMS (i.e. masses) and the above described start-up sequence may be adapted in order to maximize the highest charge-pump level phase while preventing the quickest mass to exceed its maximum allowed displacement. In an embodiment, when the quickest mass reaches the end of phase 2, it enters an amplitude regulation mode with the charge pump still set at its maximum level ST_L. In order to reach the end of phase 2, the last mass (i.e. slowest mass) will trigger the charge-pump setting to its nominal level NOM_L that was chosen for the gyroscope operation. All drive loops will then enter phase 3. At the end of phase 3 the quickest masses will wait for the last one before the gyroscope is declared started and rate measurement can take place.

Figure 3:
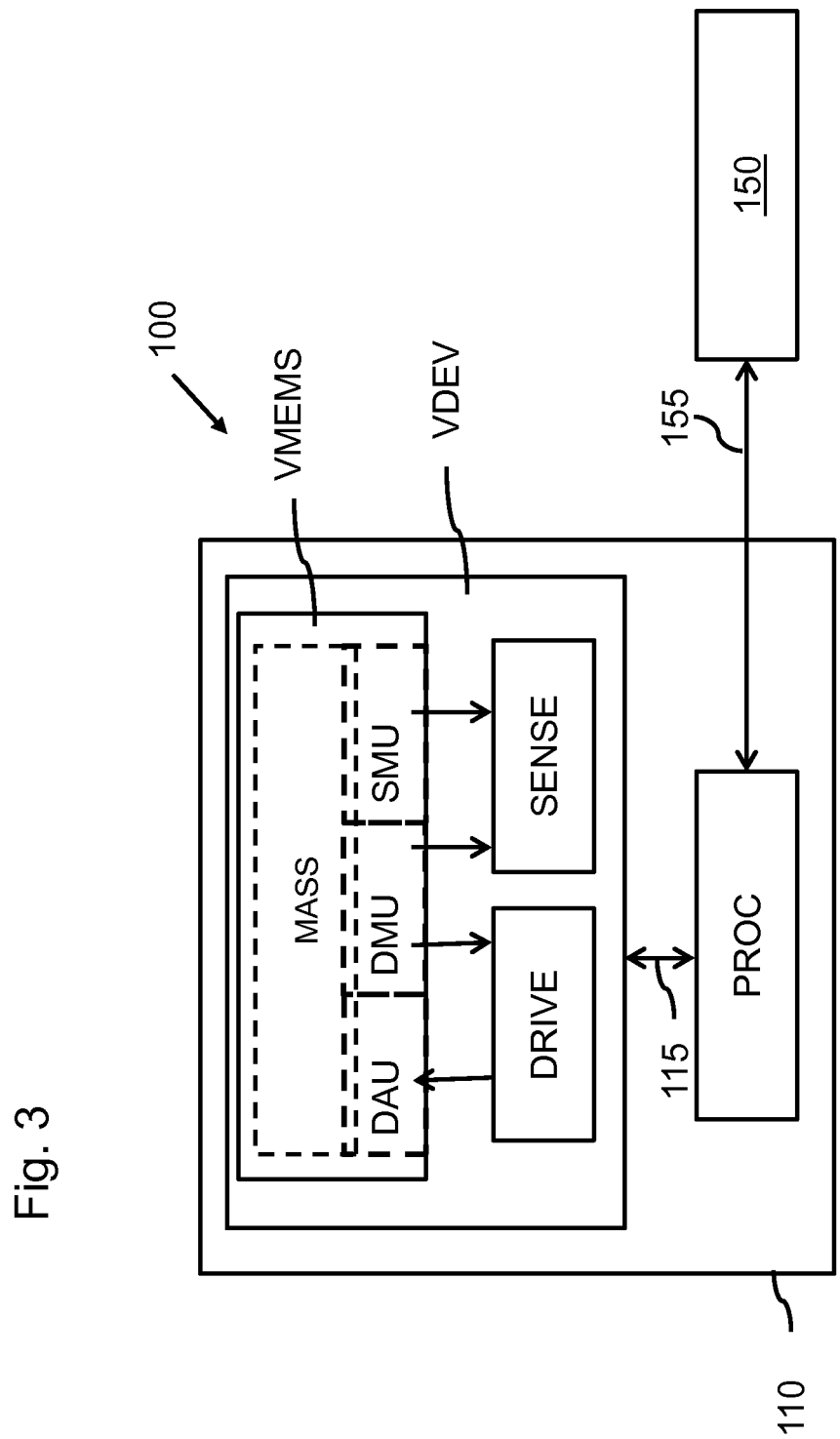
FIG. 3 schematically shows a block diagram of an example of an embodiment of an apparatus comprising a vibration gyroscope device, and FIG. 4 schematically shows a flow chart of an example of an embodiment of a method of driving a vibration gyroscope.

FIG. 3 schematically shows a block diagram of an example of an embodiment of an apparatus 100. The apparatus 100 may, for example, be a mobile communication device, a global positioning device, a game controller or a security system for e.g. a car lock. The apparatus 100 comprises a gyroscope unit 110 and a user interface unit 150. The gyroscope unit 110 comprises a vibration gyroscope device VDEV and a processor PROC. The user interface unit 150 is arranged to receive user input from, e.g., a key board, a mouse, another user input device, a memory device or another communication device. The user interface unit 150 is further arranged to present information to a user, e.g., via a display or audible signals. The gyroscope unit 110 may be provided as a semiconductor device. The processor PROC is connected to the vibration gyroscope device VDEV via a gyroscope interface signal line 115 and arranged to communicate with the vibration gyroscope device VDEV via the gyroscope interface signal line 115. The control processor PROC is connected to the user interface unit 150 via a user interface signal line 155 and arranged to communicate with the user interface unit 150 via the user interface signal line 155. In this example, the vibration gyroscope device VDEV comprises a vibration MEMS gyroscope VMEMS, a drive circuitry DRIVE and a sense circuitry SENSE. The vibration MEMS gyroscope VMEMS comprises a vibration mass MASS, drive actuation units DAU, drive measurement units DMU and sense measurement units SMU. The drive circuitry DRIVE is connected to the drive actuation units DAU and the drive measurement units DMU of the vibration gyroscope VMEMS, as described in reference to FIG. 1. The sense circuitry SENSE is connected to the drive measurement units DMU of the VMEMS and the sense measurement units SMU of the VMEMS.

According to other embodiments, the vibration gyroscope device VDEV may comprise a vibration MEMS gyroscope and a drive circuitry DRIVE according to an embodiment, such as the example of FIG. 1.

According to other aspects, a semiconductor device comprising a drive circuitry DRIVE as described above, or a vibration gyroscope device VDEV as described above, is provided. The semiconductor may e.g. comprise one or more semiconductor dies on which the drive circuitry (and optionally the gyroscope) are provided, and an integrated circuit package in which the dice/die is provided.

Figure 4:
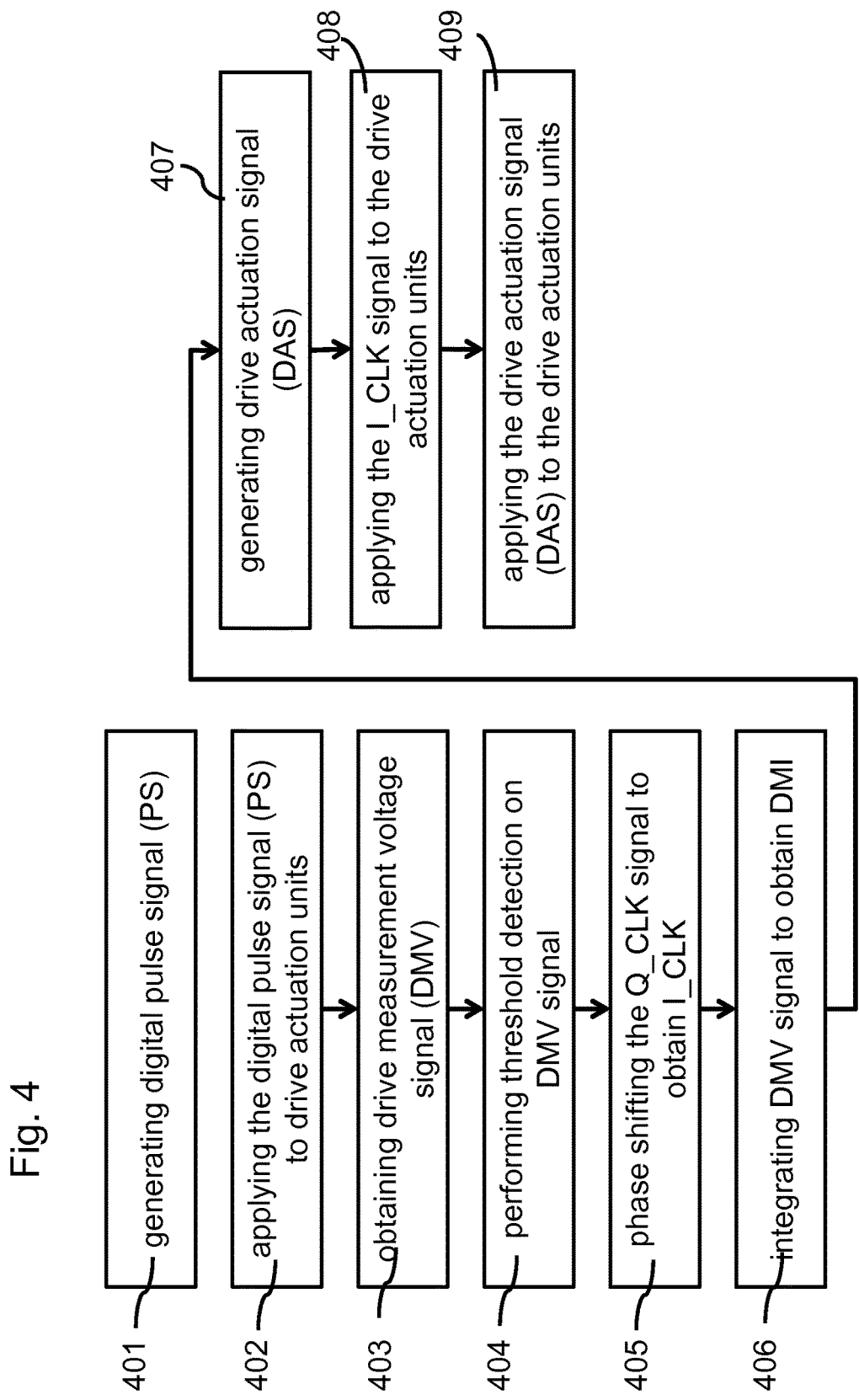

FIG. 4 schematically shows a flow chart of an example of an embodiment of a method of driving a vibration gyroscope. The method comprises generating 401 a digital pulse signal PS having a frequency substantially equal to a drive frequency Fd of the vibration gyroscope, and applying 402 the digital pulse signal PS to the drive actuation units of the vibration gyroscope during a first start-up time period. The method further comprises obtaining 403 a drive measurement voltage signal DMV indicative of a displacement of a gyroscope mass along a drive axis of the vibration gyroscope VMEMS. The drive measurement voltage signal DMV is produced by the capacitance-to-voltage converter C2V which is connected to the drive measurement units DMU.

The method also comprises performing 404 a threshold detection on the drive measurement voltage signal DMV to obtain a first digital signal Q_CLK, and phase shifting 405 the first digital signal Q_CLK to obtain a second digital signal I_CLK. The method further comprises integrating 406 the drive measurement signal DMV to obtain an integrated drive measurement voltage signal DMI. The method further comprises generating 407 a drive actuation signal DAS using the integrated drive measurement voltage signal DMI and a reference signal AGC_ref.

The method also comprises applying 408 the second digital signal I_CLK to the drive actuation units of the vibration gyroscope during a second start-up time period following the first start-up time period. Finally the method comprises applying 409 the drive actuation signal DAS to the drive actuation units of the vibration gyroscope during a measurement time period following the second start-up time period.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A drive circuitry for a vibration MEMS gyroscope, the drive circuitry comprising:
   a capacitance-to-voltage converter arranged to provide a drive measurement voltage signal indicative of a displacement of a gyroscope mass along a drive axis of the vibration gyroscope;
   a threshold detector coupled to the capacitance-to-voltage converter to receive the drive measurement voltage signal and arranged to perform a threshold detection on the drive measurement voltage signal to obtain a first digital signal;
   a digital phase shifter coupled to the threshold detector to receive the first digital signal and arranged phase shift the first digital to signal to obtain a second digital signal;
   an integrator coupled to the capacitance-to-voltage converter to receive the drive measurement voltage signal and arranged to integrate the drive measurement signal to obtain an integrated drive measurement voltage signal;
   a variable gain amplifier coupled to the integrator to receive the integrated drive measurement voltage signal and arranged to provide a drive actuation signal using the integrated drive measurement voltage signal and an amplifier gain control reference signal;
   a pulse signal generator arranged to generate a digital pulse signal having a frequency substantially equal to a drive frequency of the vibration gyroscope;
   a controller arranged to connect drive actuation units of the vibration gyroscope to outputs of:
      the pulse signal generator during a first start-up time period for allowing drive actuation units to receive the digital pulse signal from the pulse signal generator during the first start-up time period,
      the digital phase shifter during a second start-up time period following the first start-up time period for allowing the drive actuation units to receive the second digital signal from the digital phase shifter during the second start-up time period, and
      the variable gain amplifier during a measurement time period following the second start-up time period for allowing the drive actuation units to receive the drive actuation signal from the variable gain amplifier during a measurement time period.

2. A drive circuitry according to claim 1, comprising a voltage supply unit arranged to deliver a supply voltage to a primary resonator of the vibration gyroscope, and wherein the controller is arranged to control the voltage supply unit so as to:
   set the supply voltage to a nominal level during the measurement time period;
   set the supply voltage to a start-up level during the first start-up time period, the start-up level being higher than the nominal level.

3. A drive circuitry according to claim 2, wherein the controller is arranged to:
   keep the supply voltage at the start-up level during at least part of the second start-up time period.

4. A drive circuitry according to claim 3, wherein the controller is arranged to:
   keep the supply voltage at the start-up level during the complete second start-up time period.

5. A drive circuitry according to claim 2, wherein the controller is arranged to:
   receive the drive measurement voltage signal from the capacitance-to-voltage converter;
   compare the drive measurement voltage signal with a target value during the second start-up time period;
   decrease a charge pump voltage from the start-up level to the nominal level when the drive measurement voltage signal has reached the target value.

6. A drive circuitry according to claim 5, wherein the controller is arranged to:
   after decreasing the charge pump voltage from the start-up level to the nominal level, keep comparing the drive measurement voltage signal with the target value until the drive measurement voltage signal has reached the target value again at an end time of the second start-up time period;
   connect the drive actuation units of the vibration gyroscope to outputs of the variable gain amplifier at the end time of the second start-up time period.

7. A drive circuitry according to claim 1, wherein the circuitry comprises an amplifier module arranged to amplify the digital pulse signal or the second digital signal to obtain an amplified digital pulse signal having an amplitude that is higher than an amplitude of the drive actuation signal.

8. A drive circuitry according to claim 7, wherein the amplitude of the amplified digital pulse signal lies between 3.0-4.0 Volts.

9. A drive circuitry according to claim 1, wherein the charge pump is arranged to create a first and second charge pump voltage, the first charge pump voltage lying between 8.0-9.0 V, and the second charge pump voltage lying between 6.0-7.0 V.

10. An apparatus comprising a vibration MEMS gyroscope device according to claim 9.

11. A vibration MEMS gyroscope device comprising a vibration gyroscope and a drive circuitry according to claim 1.

12. A semiconductor device comprising a vibration MEMS gyroscope device according to claim 11.

13. A semiconductor device comprising a drive circuitry according to claim 1.

14. A method of driving a vibration MEMS gyroscope, the method comprising:
   generating a digital pulse signal having a frequency substantially equal to a drive frequency of the vibration gyroscope;
   applying the digital pulse signal to the drive actuation units of the vibration gyroscope during a first start-up time period;
   obtaining a drive measurement voltage signal indicative of a displacement of a gyroscope mass along a drive axis of the vibration gyroscope;
   performing a threshold detection on the drive measurement voltage signal to obtain a first digital signal;
   phase shifting the first digital signal to obtain a second digital signal;
   integrating the drive measurement signal to obtain an integrated drive measurement voltage signal;
   generating a drive actuation signal using the integrated drive measurement voltage signal and a reference signal;
   applying the second digital signal to the drive actuation units of the vibration gyroscope during a second start-up time period following the first start-up time period, and applying the drive actuation signal to the drive actuation units of the vibration gyroscope during a measurement time period following the second start-up time period.

15. A method according to claim 14, further comprising:
setting a supply voltage for a primary resonator of the vibration gyroscope to a start-up level during the first start-up time period;
setting the supply voltage to a nominal level during the measurement time period, the start-up level being higher than the nominal level.

16. A method according to claim 15, further comprising:
keeping a charge pump voltage at the start-up level during at least part of the second start-up time period.

17. A method according to claim 15, further comprising:
comparing the drive measurement voltage signal with a target value during the second start-up time period;
decreasing the charge pump voltage from the start-up level to the nominal level when the drive measurement voltage signal has reached the target value.

* * * * *